July 7, 1964                 J. D. CONTI                 3,140,039
                      FLEXIBLE WALL CONTAINER
                        Filed Aug. 3, 1960

3,140,039
FLEXIBLE WALL CONTAINER
John D. Conti, Elkins Park, Pa., assignor, by mesne assignments, to FMC Corporation, San Jose, Calif., a corporation of Delaware
Filed Aug. 3, 1960, Ser. No. 47,208
2 Claims. (Cl. 229—62)

The invention relates to flexible-wall containers having openings which are reinforced against tearing.

In general, the invention is concerned with providing flexible-wall containers with reinforced openings without the use of conventional metal eyelets or other similar reinforcing means.

A primary object of the invention is to provide a container formed of flexible material having at least a coating of thermoplastic material with a reinforced opening adapting the same for suspended support without deforming or tearing.

This and other objects and advantages of the invention will become apparent from the following description and accompanying drawing in which.

Figure 1:
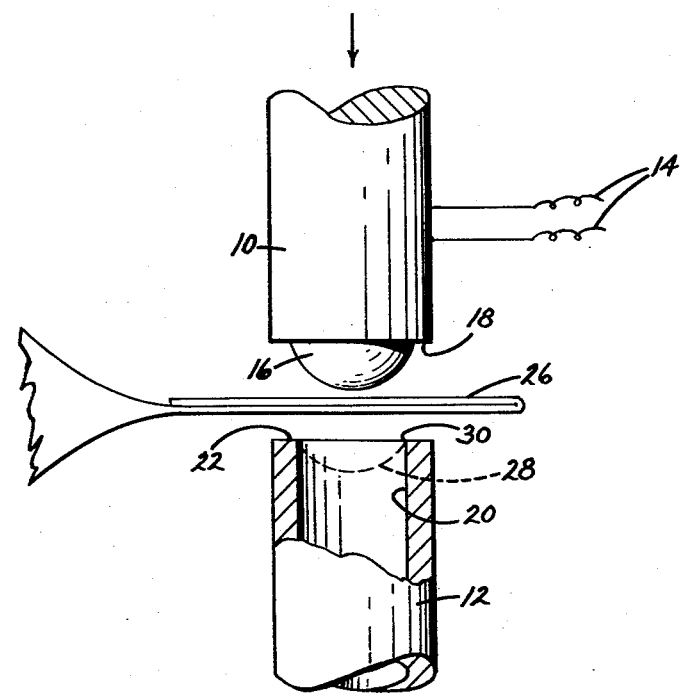
FIGURE 1 is a side view of the apparatus employed in making the container of the present invention, with a portion thereof being broken away.
Figure 2:
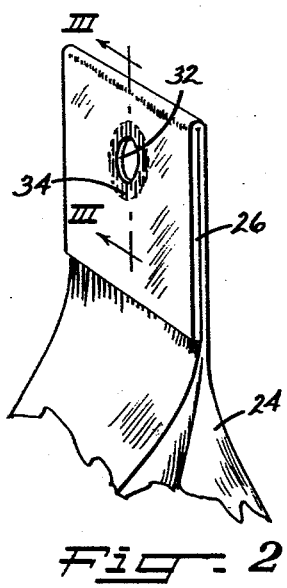
FIGURE 2 is a perspective view of a portion of flexible-walled container having a reinforced opening formed in one end thereof.
Figure 3:
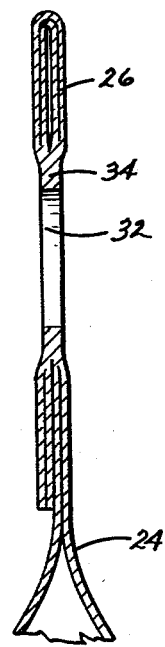
FIGURE 3 is a vertical section taken along the line III—III of FIGURE 2.

Broadly, the present invention is directed to flexible-wall containers having reinforced openings formed by perforating overlapped wall portions of the container while concomitantly fusing, and more particularly searing the same in the area immediately adjacent to and surrounding such perforation to thereby provide an integral and rigid or hard reinforcing structure or mass. The apparatus employed in making such reinforced opening includes a pair of jaws having cooperating annular surfaces, with at least one jaw being heated and mounted for movement toward and away from the other of the pair of jaws. Substantially centrally of the sealing surfaces, one jar is formed with an opening or recess while the opposing jaw includes a mating generally hemispherically shaped projection. The projection is of a diameter slightly greater than that of the recess whereby the projection and the edge of the opposing recess cooperate to cut sheet materials placed therebetween when the jaws are urged into closed relationship.

Any suitable heat-sealing material may be used in the practice of the present invention, such as films or sheets of rubber hydrochloride or other derivative, sheets of thermoplastic resins, regenerated cellulose or paper base sheets provided with suitable heat-sealing coatings which may, if desired, be moisture-proof coatings, such as regenerated cellulose films or paper carrying coatings of a thermoplastic resin, such as polyethylene, saran, or rubber hydrochloride, such heat-sealing coatings being anchored to the base sheet, if desired, by an intermediate coating or subcoating of urea formaldehyde or melamine formaldehyde resins.

Referring now to the drawing, the apparatus used in forming the reinforced openings includes a pair of opposed sealing jaws 10 and 12 which are mounted for relative axial movement toward and away from each other by any suitable means, not shown. At least one and preferably both of the jaws 10 and 12 is heated by means as indicated at 14. A generally hemispherical projection 16 is formed at one end of the jaw 10 and is encircled by a smooth annular sealing surface 18. The adjacent end of the other jaw 12 is formed with a circular opening or recess 20, which mates with the projection 16 of the jaw 10, and also includes an annular sealing surface 22.

In employing the above-described apparatus in forming a reinforced opening in a conventional flexible wall container or bag 24 having a closed end 26, the container is positioned between the jaws 10 and 12 as illustrated in FIGURE 1, after which one or both jaws are moved axially toward each other. The recess 20 is slightly smaller in diameter than the projection 16 and thus as the projection moves into a position as shown by broken lines at 28 the annular edge 30 of the recess 20 cuts a desired opening 32 in the container closed end 26. In effect, the annular edge 30 of the recess 20 exerts a shearing action on the sheet material of the container 24, with the projection 16 serving as an anvil. Concomitantly with this perforating or shearing of the container closed end 26, the opposed sealing surfaces 18 and 22 on the jaws 10 and 12, respectively, snugly grip the portions of the container immediately adjacent to and surrounding the formed opening 32. With at least one of the jaws 10 and 12 being heated, as noted above, the portions of the container closed end 26 gripped between the jaw sealing surfaces 18 and 22 are fused together, and more particularly seared, to provide a unitary and relatively rigid or solid mass as indicated at 34.

From the above description of the operation of the disclosed apparatus, it will be apparent that the size relationship between the cooperating projection 16 and recess 20 must be such as to facilitate shearing of the material placed therebetween, yet enable the opposed sealing surfaces 18 and 22 to snugly grip that portion of the material immediately adjacent to and surrounding the formed opening. Preferably, the size relationship between the projection 16 and recess 20 is such as to space the jaw sealing surfaces 18 and 22 away from each other a distance slightly less than the thickness of the closed end 26 of the container 24 when the jaws 10 and 12 are in closed position. With this arrangement, the jaw sealing surfaces 18 and 22 will exert a firm pressing action on the portions of the container disposed therebetween and will assure uniform and proper searing of the same. Further, it will be understood that the projection 16 may be in the form of a ball or sphere which is captively retained at the end of the jaw 10 yet is free to rotate to distribute wear.

The rigid or hard mass 34 provided around the opening 32 in the closed end of the container 24 satisfactorily resists deformation and reinforces the container against tearing at this area and thus renders the containers suitable for suspended support, as for example for display purposes.

While preferred embodiments of the invention have been shown and described, it is to be understood that changes and variations may be made without departing from the spirit and scope of the invention as defined in the appended claims.

I claim:
1. In a container formed of flexible material having at least a surface coating of thermoplastic material, said container having a plurality of walls and being closed at one end by having opposing walls engaged, folded over, and sealed to each other, the improvement comprising an opening extending through the sealed opposing walls of the container, and an integral and rigid structure formed by searing portions of said walls immediately adjacent to and surrounding said opening, said rigid structure serving to reinforce said opening whereby said container may be suspendedly supported by means extending through said opening.

2. A container formed of flexible regenerated cellulose sheet material having at least one surface thereof coated with a thermoplastic material, said container including a plurality of walls forming a general tubular section, said tubular section being collapsed at one end by having wall portions disposed in contacting relationship and sealed to each other, said contacting and sealed wall portions being together seared along an annular area to form an integral, hard, and rigid ring-like structure and an opening extending substantially centrally through said ring-like structure, said opening being smaller in size than said annular area whereby the hard and rigid ring-like structure surrounding said opening serves to reinforce the same.

References Cited in the file of this patent

UNITED STATES PATENTS

| | | |
|---|---|---|
| 1,344,962 | Robinson | June 29, 1920 |
| 2,332,792 | Gross et al. | Oct. 26, 1943 |
| 2,510,383 | Dalgleish | June 6, 1950 |
| 2,633,441 | Buttress | Mar. 31, 1953 |
| 2,690,253 | Francois | Sept. 28, 1954 |
| 2,711,853 | Poppe | June 28, 1955 |
| 2,781,162 | Soffa | Feb. 12, 1957 |
| 2,796,913 | Fener et al. | June 25, 1957 |
| 2,878,849 | Lingenfelter et al. | Mar. 24, 1959 |